United States Patent Office 2,861,060
Patented Nov. 18, 1958

2,861,060
INITIATOR SYSTEMS

William E. Goode, Beverly, N. J., assignor to Rohm & Haas Company, Philadelphia, Pa., a corporation of Delaware No Drawing. Application September 10, 1954
Serial No. 455,349

4 Claims. (Cl. 260—89.5)

This invention concerns a process for polymerizing esters of acrylic and methacrylic acids. In this process one or more of the said esters or a mixture of one or more of the said esters and another polymerizable ethylenically unsaturated compound is treated with a polymerization initiator system which comprises an amine oxide in which there is a substituent having benzenoid unsaturation and a carboxylic anhydride. The polymerization initiator system may also contain a promotor, such as a thiophenol, alcohol, or carboxylic acid. This invention also deals with polymerizable compositions wherein a said amine oxide and a carboxylic anhydride are dissolved in an ester of acrylic or methacrylic acid or a mixture of polymerizable comonomers which includes a said ester as a major component.

It has been suggested that triethylamine oxide might be used below 200° C. as a polymerization initiator for preparing polyethylene. Amine oxides in general, however, have been found too slow in their initiating action to receive serious consideration for forming acrylic resins. In some cases it has been observed, amine oxides provide some catalytic action at the start, but polymerization soon ceases. Thus, amine oxides have not proved to be useful in the polymerization of acrylates and methacrylates, particularly below 120° C. Amine oxides have also been proposed as inhibitors for preventing polymerization of various polymerizable vinylidene compounds.

In spite of the previous considerations about amine oxides it has now been discovered that there are amine oxides which can be utilized in useful initiator systems by combining an amine oxide of the type described below with a reactive carboxylic anhydride. The amine oxides which are thus effective must have at least one N-substituent with benzenoid unsaturation. The anhydrides which activate these amine oxides are those of simple saturated carboxylic acids and of acrylic or methacrylic acid.

Even though the amine oxides by themselves have but little influence, if any, in initiating polymerization and the anhydrides by themselves have none at all, the combination provides an initiator system which is useful. The resulting initiator or catalyst system is effective with esters of acrylic or methacrylic acid at temperatures between 20° and 120° C., preferably between 50° and 90° C. Thus, this invention is also concerned with the process of polymerizing acrylic esters by dissolving therein a defined amine oxide and a defined carboxylic anhydride and maintaining the mixture between 20° and 120° C. until polymerization has occurred. At temperatures between 20° and 50° C. several days may lapse before polymerization is sufficiently complete, but this is sometimes of considerable advantage, as where relatively large castings are required. Above this range of temperature polymerization proceeds with increasing rates as temperatures are raised.

Polymerizable compositions are prepared by dissolving in an ester of acrylic or methacrylic acid or a mixture of polymerizable comonomers containing a said ester about 0.01% to about 2% of a said amine oxide and a roughly equivalent amount of an active carboxylic anhydride. The compositions of this invention may also comprise a said ester, between 0.01% and 2% of a said amine oxide, approximately a corresponding amount of a carboxylic anhydride, and from 0.001% to about 0.1% of a promotor providing an —OH or an —SH group, as in an alcohol, carboxylic acid, thiocarboxylic acid, or thiophenol.

The acrylic esters which are used in formulating a polymerizable composition are primarily alkyl acrylates and methacrylates. The alkyl group may be large or small, branched or straight-chained. Equivalent to the alkyl esters are cycloalkyl and benzyl acrylates and methacrylates. Typical esters are methyl, ethyl, propyl, isopropyl, butyl, isobutyl, sec-butyl, tert-butyl, amyl, hexyl, octyl, nonyl, decyl, dodecyl, hexadecyl, octadecyl, cyclohexyl, benzyl, chlorobenzyl, and trichloroethyl acrylate and methacrylate. The usual ester may be represented by the formula

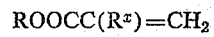

$$ROOCC(R^x)=CH_2$$

where $R^x$ is hydrogen or methyl and R is commonly alkyl.

There may be used in conjunction with an acrylic ester or a mixture of such esters one or more miscible, compatible, free-radical copolymerizable, other monovinylidene monomers in a minor proportion. Usually such other monovinylidene compound is used in an amount of not over 30% of the polymerizable mixture, but in some cases the proportion of compatible copolymer does not reach this limit. For example, not over 20% of the polymerizable mixture should be vinyl acetate or propionate. There may similarly be used in proportions of not over 30% acrylonitrile, methacrylonitrile, acrylamide, N-methacrylamide, methacrylamide, and other similar amides, glycidyl acrylate, glycidyl methacrylate, acrylic or methacrylic acid or dimethyl itaconate. Some of these substances by themselves show no acceleration in polymerization from the addition of initiator with activator and/or promotor of this invention. It is, therefore, understandable that only limited amounts of the above and practically none of other monovinylidene compounds can be used.

The acrylic esters may also be polymerized in the presence of saturated linear polymers which are soluble therein. Thus, a powdered acrylic resin may be dissolved in an alkyl acrylate or methacrylate or a mixture of these esters. There may thus be used poly(methyl methacrylate), poly(ethyl acrylate-methyl acrylate), or like polymer.

Instead of relying upon a separately formed saturated linear polymer, I may form polymer in situ at a relatively low level of conversion, but one sufficient to increase the viscosity of the composition. This may be done by adding an organic peroxide, best at a low concentration, for example, below 0.1%, and heating between 50° and 100° C. until sufficient polymerization has occurred to impart a definite increase in viscosity, but short of the Trommsdorff peak. The resulting thickened solution is now treated with a defined amine oxide and carboxylic anhydride without or with a promotor. This method may have economic advantages.

As the amine oxide which is used in the initiator system, there is used the oxide of a tertiary amine in which there is a group having benzenoid unsaturation, such as a phenyl group which is attached to the amino nitrogen or is not more than one carbon removed from this nitrogen. One important group of such amines comprises the N,N-dialkyl-N-arylamines, of which the N,N-dialkyl-N-phenylamines having alkyl groups of not over four carbon atoms are the most important. The alkyl groups may be methyl, ethyl, propyl, butyl, or larger groups. In place of the phenyl group itself there may be used a naphthyl group or a neutrally substituted phenyl group such as tolyl, xylyl, chlorophenyl, isopropylphenyl, butylphenyl, butylnaphthyl, phenylphenyl, cyclohexylphenyl, or benzylphenyl. There may be more than one N-phenyl substituent, as in methyldiphenylamine or triphenylamine. In place of an N-phenyl group there may be used to supply benzenoid unsaturation a benzyl group, which may also be used to replace one or more of the above alkyl groups. Thus, there may be used the oxides of dimethylbenzylamine, dibutylbenzylamine, tribenzylamine, dibenzylaniline, and the like. Amine oxides of the kinds thus far discussed are derived from amines which may conveniently be summarized by the formula

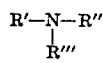

where R is alkyl or benzyl, R" is alkyl, benzyl, or phenyl, and R''' is benzyl or phenyl.

Instead of utilizing the benzenoid unsaturation in a phenyl or naphthyl group there may be used an oxide of a tertiary heterocyclic amine having this same kind of unsaturation, as in pyridine, α-, β-, or γ-picoline, quinoline, the lutidines, or the collidines. The amine oxides from pyridine and the like are of considerable value in this invention as they can be made in good yields and with good colors.

The amine oxides which may be used are, in summary, oxides of tertiary amines having at least one substituent having benzenoid unsaturation which is not removed from the amine nitrogen by more than one carbon atom. Numerous tests have shown the amine oxides within this definition to be generally effective whereas most of those examined outside of this class have failed in one or more respects.

The amount of amine oxide taken may vary from about 0.01% to 2% of the weight of the polymerizable composition in which it is used. The amount is preferably from 0.05% to 0.5%. The optimum amount of amine oxide used in a polymerizable composition will vary somewhat with the type of amine, molecular weight, and choice of monomer or comonomers. For example, with lower alkyl acrylates amounts of 0.05% to 0.25% are best used. With alkyl methacrylates considerably higher concentrations can be used with good control of the rate of polymerization. Some adjustment may prove desirable for a particular combination of comonomers to form copolymers. A few simple trials indicating the optimum range are suggested.

As the second essential component of the initiator system, there is used a carboxylic acid anhydride. Typical of the effective anhydrides are acetic anhydride, propionic, or butyric anhydrides, or other fatty acid anhydride, benzoic anhydride, methylbenzoic anhydride, chlorobenzoic anhydride, succinic anhydride, chloroacetic anhydride, trichloroacetic anhydride, trifluoroacetic anhydride, or methacrylic or acrylic anhydride.

The proportion of anhydride to form a polymerizable composition depends primarily upon the proportion of amine oxide used. The anhydride should be about equivalent to the amine oxide as a first approximation, but may vary from about one half equivalent to two equivalents per equivalent of the amine oxide.

The carboxylic anhydrides may be represented by the formula

where $R^1$ and $R^2$ when taken individually are alkenyl or alkyl groups, particularly those of not over four carbon atoms, or halogenated derivatives thereof, or when taken together form an alkylene group having a chain of two carbon atoms joining the two carbonyl groups, as in succinic or methylsuccinic acids.

While compositions containing a defined amine oxide and carboxylic anhydride dissolved in an acrylic ester or such ester together with other polymerizable vinylidene compound are polymerizable under favorable temperature conditions within a proper period of time, the polymerizing action may be accelerated by incorporating into the composition a small proportion of a polymerization promotor. Thiophenol has been found to be a very effective promotor at 0.002% to about 0.1% and best at 0.01% to 0.03%. There may likewise be used alkylphenylthiols, such as methylphenylthiol, butylphenylthiol, or mercaptonaphthalene. These may be used in somewhat larger amounts by weight than thiophenol, in general in proportion to their increased molecular weights. In fact any thiophenol appears to be quite active and effective as a polymerization promotor. The thiophenols form, therefore, a subclass of considerable importance.

Polymerization of compositions of this invention may be effected in bulk, in solution, in suspension or bead form. As solvents there may be used naphthas, including aromatic naphthas, benzene, toluene, xylene, alcohols, such as methyl, ethyl, isopropyl, or butyl, esters, such as ethyl or butyl, acetate, chlorinated solvents, ethers including ethyl and isopropyl ethers or dioxane, ketones, and other inert solvents and mixtures thereof. Solvent solutions may contain from 5% to 60% or even more of monomer or monomer-polymer mixtures. Bead polymerizations are carried out in manners conventional with other polymerizable systems and initiators.

The polymers which result are useful in coatings, laminates, castings, and moldings, and as impregnates, adhesives, and the like.

Typical compositions are shown in the following illustrative examples together with processes for forming polymeric products within the teachings of this invention. Parts shown are by weight.

*Example 1*

Methyl methacrylate containing 0.5% of N,N-dimethyl-p-toluidine oxide and 0.5% of benzoic anhydride was placed in a reaction vessel, degassed under 100 mm. pressure, and heated in an oil bath at 60° C. After one hour the mixture has set to a gel. Continued heating at 60° C. produced a hard, clear resin.

A similar solution containing 0.5% of N,N-dimethyl-p-toluidine oxide, but no anhydride, when treated in the same manner showed no evidence of polymerization during twenty-four hours.

*Example 2*

A solution of 0.236% benzoic anhydride and 0.169% pyridine-N-oxide in methyl methacrylate was placed in the bulb of a dilatometer, frozen, and the dilatometer evacuated to a pressure of $10^{-3}$ mm. of Hg. The frozen mixture then was melted under this vacuum to allow the dissolved gases to volatilize. This degassing procedure was repeated twice more, mercury was added to the dilatometer under vacuum, and the dilatometer was placed in a bath at 60+0.05° C. The rate of polymerization was calculated from the observed rate of contraction of the mercury column in the capillary tube of the dilatometer. The initial rate of polymerization was found to be 1.83% per hour, and the peak rate, reached after seventeen hours, was 13.5% per hour. A hard, clear polymer was formed.

*Example 3*

The rate of polymerization of a solution of 0.099% of N,N-dimethyl-p-toluidine oxide and 0.098% of benzoic anhydride in methyl methacrylate at 60° C. was determined by the dilatometric method described in Example 2. The initial rate of polymerization was found to be 2.195% per hour and the peak rate, reached after 12.8 hours, was 13.2% per hour. A hard, clear polymer was formed.

Example 4

By using the dilatometric technique described above, it was shown that a solution of methyl methacrylate containing 0.0715% N,N-dimethylaniline oxide and 0.077% benzoic anhydride polymerizes at 60° C. at an initial rate of 1.07% per hour. The Trommsdorff peak was reached at the end of 30 hours. In a similar experiment employing 0.0909% of N,N-dimethylaniline oxide and 0.0999% acetic anhydride the initial rate was 0.85% per hour. A hard, clear polymer was formed.

Example 5

A solution containing 0.1055% pyridine oxide and 0.0831% acetic anhydride in methyl methacrylate, when heated at 60° C. in a dilatometer, exhibited an initial polymerization rate of 0.905% per hour. The Trommsdorff peak was reached after 29.2 hours. An otherwise identical solution, to which 0.0234% of thiophenol had been added, polymerized at an initial rate of 7.07% per hour and reached a peak rate after 9.2 hours. A hard, clear polymer was formed.

Example 6

A solution containing 0.104% of 4-methylpyridine oxide, and 0.098% of benzoic anhydride dissolved in methyl methacrylate was heated at 60° C. A Trommsdorff peak was recorded at 14.5 hours. The product was a clear, hard solid.

Repetition of the above procedure with substitution of 0.1% of diphenylmethylamine oxide for the 4-methylpyridine oxide likewise causes formation of a hard, clear polymer. Substitution of tribenzylamine oxide likewise gives good polymerization when utilized in the above way.

Example 7

A solution containing 0.3% of benzoic anhydride and 0.3% of N,N-dimethyl-p-toluidine oxide in n-butyl methacrylate was degassed at 100 mm. of Hg and placed in a cellophane bag. The bag was sealed by means of a clamp in such a fashion as to eliminate the free air space above the surface of the liquid. The bag was placed in an oven at 60° C. After one and one-half hours the solution had become viscous and a clear, firm polymer was obtained after approximately eight hours.

Example 8

A solution of trifluoroacetic anhydride (0.525%) and 4-picoline-N-oxide (0.36%) in methyl methacrylate monomer was degassed and placed in a cellophane bag as described in Example 7. The solution became viscous after approximately three and one-half hours in a 60° C. oven. Several hours later a clear, hard polymer was obtained.

Tricholoracetic anhydride may be substituted with like result.

Example 9

A solution of 0.30% of 4-picoline-N-oxide and 0.37% of succinic anhydride in methyl methacrylate was treated as described in Example 7. A heard, clear resin was obtained after twenty-four hours at 60° C.

Example 10

A solution of N,N-dimethyl-p-toluidine oxide (0.33%) and benzoic anhydride (0.30%) in ethyl acrylate monomer was placed in a test tube and degassed by bubbling a stream of nitrogen through the liquid. The tube was stoppered and placed in a bath at 60° C. A viscosity increase was noted in one hour. Polymerization was found to be essentially complete after the tube had remained in the bath overnight.

In a similar experiment employing a more strenuous degassing technique, polymerization occurred to the extent of about 70% in less than twenty minutes. In other preparations tribenzylamine oxide is used in place of the above oxide. Essentially complete polymerization is likewise obtained. There may be used in the same way dimethylbenzylamine oxide with formation of a satisfactory polymer.

In several experiments similar to those described above, combinations of both maleic and phthalic anhydrides with a variety of amine oxides were found to be ineffective in initiating the polymerization of either methyl methacrylate or of ethyl acrylate.

Example 11

A solution is made from 20 parts of dioctadecyl itaconate, 180 parts of lauryl methacrylate, 2 parts of 4-methylpyridine-N-oxide, 1.5 parts of acetic anhydride, 0.5 part of thiophenol, and 250 parts of toluene. This mixture is slowly added to a reaction vessel equipped with stirrer, blanketed with a stream of nitrogen, and heated with an oil bath kept at about 100° C. After three hours addition is made of a solution in toluene of 0.5 part of this amine oxide and 0.35 part of acetic anhydride. Again, at 6.0 hours, 7.0, and 8.0 the same addition is made. Heating is continued for 24 hours. There results a viscous solution of copolymer which acts as a pour point depressant in waxy mineral oils.

Example 12

A solution is made of 35 parts of powdered polymethyl methacrylate in 65 parts of freshly distilled methyl methacrylate. There is added to this solution 12 parts of a solution of 0.5 part of N,N-dimethylaniline oxide and 0.5 part of benzoic anhydride. The resulting solution is run into a reaction vessel which has been swept out with nitrogen and maintained under nitrogen. The charge is heated at 70° C. Within an hour the charge gels and on continued heating for five hours a hard, clear polymer forms.

Example 13

There are mixed 85 parts of methyl methacrylate from a commercial source and 15 parts of acrylonitrile. There are added thereto with stirring 0.2 part of pyridine oxide and 0.3 part of benzoic anhydride. The mixture is subjected to low pressure to remove dissolved air and then blanketed with nitrogen. The mixture is heated at 75° C. for 18 hours. A hard, clear polymer forms.

In the same way 80 parts of methyl methacrylate and 20 parts of vinyl acetate are mixed with the initiator system as above and a copolymer formed. By including 0.01% of p-toluenethiol polymerization is complete at 60°–65° C. overnight.

The polymerizable composition may contain common additives, such as release agents, stabilizers, plasticizers, dyes, or pigments.

Example 14

A solution consisting of 0.10 part of 4-picoline oxide, 0.11 part of trifluoroacetic anhydride, and 0.5 part of a light stabilizer in 100 parts of methyl methacrylate was degassed under reduced pressure and placed in a cell constructed from two sheets of plate glass separated by a rigid spacer. The cell was heated in an oven at 60° C. for twenty-four hours, then for one hour at 80° C. followed by one hour at 110° C. A sheet of hard, clear resin was obtained. This material was equivalent in its physical properties to a control prepared with a peroxide initiator, but did not suffer from the direct disadvantages resulting from the presence of residual peroxide.

The polymers of methyl methacrylate described in the above examples possessed viscosity average molecular weights of approximately six million.

I claim:

1. A process of forming polymers which comprises mixing with an ester of the formula

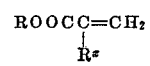

where R is an alkyl group and $R^z$ is a member of the class consisting of hydrogen and the methyl group, a catalyst system consisting essentially of an oxide of a tertiary amine having at least one substituent having benzenoid unsaturation not removed from the amine nitrogen by more than one carbon atom and an anhydride of an acid from the class consisting of saturated fatty monocarboxylic acids of not over four carbon atoms, halogenated derivatives thereof, benzoic acid, and succinic acid, and maintaining the resulting mixture between 20° and about 120° C. until polymerization has occurred.

2. A process for preparing polymers which comprises forming a mixture comprising an ester of the formula $$ROOCC=CH_2$$
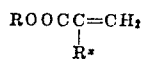

where R is an alkyl group and $R^z$ is a member of the class consisting of hydrogen and the methyl group, and a catalyst system consisting essentially of an oxide of a tertiary amine having benzenoid unsaturation not removed from the amine nitrogen by more than one carbon atom, and an anhydride of an acid from the class consisting of saturated fatty monocarboxylic acids of not over four carbon atoms, halogenated derivatives thereof, benzoic acid, and succinic acid, the said oxide forming 0.01% to 2% by weight of the resulting mixture and the said anhydride being about equivalent to the said oxide, and heating the mixture between 50° and 90° C.

3. The process of claim 2 wherein the ester is methyl methacrylate.

4. A process for preparing polymers which comprises forming a mixture comprising an ester of the formula $$ROOCC=CH_2$$
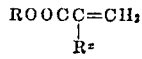

where R is an alkyl group and $R^z$ is a member of the class consisting of hydrogen and the methyl group, and a catalyst system consisting of an oxide of a tertiary amine having benzenoid unsaturation not removed from the amine nitrogen by more than one carbon atom, and an anhydride of an acid from the class consisting of saturated fatty monocarboxylic acids of not over four carbon atoms, halogenated derivatives thereof, benzoic acid, and succinic acid, and a thiophenol as a promotor, the said oxide forming 0.01% to 2% by weight of the resulting mixture, the said anhydride being about equivalent to the said oxide, and the said promotor forming 0.002% to 0.1% by weight of the mixture, and maintaining the mixture between 20° and 120° C.

References Cited in the file of this patent

UNITED STATES PATENTS

| | | |
|---|---|---|
| 2,045,651 | Hill | June 30, 1936 |
| 2,398,926 | Dorough | Apr. 23, 1946 |
| 2,647,878 | Lee | Aug. 4, 1953 |
| 2,744,886 | Protzman | May 8, 1956 |